United States Patent [19]

Mang et al.

[11] 4,202,435

[45] May 13, 1980

[54] AUTOMATIC RECIPROCATING, INDEXING AND PICKING ASSEMBLY APPARATUS

[75] Inventors: Josef Mang, Palos Hills; Robert W. Waters, Waukegan, both of Ill.

[73] Assignee: Emerson Electric Co., Chicago, Ill.

[21] Appl. No.: 938,085

[22] Filed: Aug. 30, 1978

[51] Int. Cl.² .............................................. B23Q 7/02
[52] U.S. Cl. ................................. 198/339; 198/480; 198/803; 414/750
[58] Field of Search .................... 414/222–225, 414/744, 749–751; 198/339, 480, 482, 803

[56] References Cited

U.S. PATENT DOCUMENTS

| | | | |
|---|---|---|---|
| 2,678,719 | 5/1954 | Davis | 198/803 |
| 3,062,362 | 11/1962 | Erkelens et al. | 198/803 |
| 3,397,799 | 8/1968 | Wallis | 414/750 |
| 3,411,636 | 11/1968 | Wallis | 414/750 |
| 3,438,478 | 4/1969 | Bridge | 198/803 X |
| 3,703,834 | 11/1972 | Beemer | 414/749 X |
| 3,992,245 | 11/1976 | Franklin | 198/803 X |
| 4,027,767 | 6/1977 | Gluck | 198/339 |

Primary Examiner—Stephen G. Kunin
Assistant Examiner—Terrance L. Siemens
Attorney, Agent, or Firm—McCaleb, Lucas & Brugman

[57] ABSTRACT

An automatic, multiple station, reciprocating, indexing and picking assembly apparatus wherein a motor-driven reducer mechanism is drivably connected to an indexer mechanism for providing indexed rotation of an assembly dial plate, and to a first cam-actuated oscillator for providing reciprocation through a first shaft to a first plate carrying retractable slide pick-up units, and through an adjustable positive drive and a second reducer mechanism to a second cam-actuated oscillator for providing reciprocation through a second shaft to a second plate, the latter being connected through pivotal linkages to the pick-up units on the first plate. Relative vertical displacement between the reciprocating first and second plates effects horizontal extension and retraction of the pick-up units, while overall displacement of the first and second plates relative to the indexed assembly dial plate allows for uninterrupted, indexed rotation of the dial plate and for vertical pick-up and placement of component parts. Adjustment of the positive drive means provides for synchronization of the reciprocation of the first and second plates. Stop-block and lost motion mechanisms are used to control the travel of the pick-up units so as to eliminate the effects of any non-parallel travel of the first and second plates due to normal manufacturing tolerance variations in the oscillators.

6 Claims, 8 Drawing Figures

AUTOMATIC RECIPROCATING, INDEXING AND PICKING ASSEMBLY APPARATUS

BACKGROUND OF THE INVENTION

1. Field of the Invention

This invention relates to automatic assembly apparatus, and more particularly to cam-actuated, reciprocating and indexing, multiple-station assembly apparatus.

2. Description of Prior Art

There is an ever increasing demand for automatic assembly devices, including those that through indexing are capable of performing a series of assembly operations. In many multiple-station, automatic assembly set-ups, an individual slideable pick-up unit or so-called pick and place unit is used at each station to move tooling, grasp parts, place parts in tooling fixtures, and so forth. Typically, whenever such multiple-station assembly set-ups were constructed in the past, especially where both vertical and horizontal movements of the pick-up units were required, a cam-actuated oscillator device was used with each pick-up unit to provide the necessary actuation.

Attempts have also been made to use an open cylindrical or barrel cam with multiple cam tracks to simultaneously operate several pick and place units, through the reciprocation of various tool-carrying plates. However, due to the need for proper synchronization of the various plates and associated assembly devices, a multiple surface cam had to be manufactured to extremely close tolerances. If any one cam track was formed slightly out of phase from another track during manufacture, the required synchronization of the associated assembly components was not provided. Any lack of synchronization, especially where pick and place mechanisms and associated tooling are involved, can result in misaligned parts, jammed or broken tooling, and so forth. Thus, mis-manufactured multiple track cams were usually scrapped as they could not readily be adjusted to overcome the unwanted phase differentials in the assembly structures they actuated. Additionally, the use of open cylindrical cams is undesirable because they can not be easily lubricated or protected from contamination, and their life spans can not be reliably predicted.

SUMMARY OF THE INVENTION

The present invention overcomes these and other prior art problems by providing a multiple-station, reciprocating, indexing and picking assembly apparatus comprising a lower reciprocating tooling plate or so-called assembly dial plate driven by an indexer mechanism, a reciprocating middle plate carrying a plurality of slideable pick and place units and driven by a first oscillator device, and a reciprocating upper plate driven by a second oscillator device and connected by pivotal linkages to the pick and place units. Speed reducers are utilized for each of the oscillator devices. One motor means is used to drive one of the speed reducers from which the other speed reducer, one of the oscillators and the indexer mechanism are all driven.

The speed reducers are connected at their inputs by an adjustable positive drive means to eliminate any non-parallel displacement of the middle and upper plates. Since any adjustment between the inputs of the reducers is diminished by the reduction ratios thereof, the reducers' respective outputs can be adjusted in minute increments. With such a fine tune rather than gross type adjustment capability for the reducers, reciprocation of the middle and upper plates can be substantially synchronized. This fact, plus the use of appropriate spring-loaded lost motion mechanisms and adjustable stop means in connection with the pick and place units, assures substantially vertical travel for the pick-up units and associated parts. Additionally, in the preferred embodiment, both oscillator devices utilize conjugate type cam members and yoke-mounted followers which are totally enclosed within an oil bath, rather than the less desirable open type cam.

In effect, the vertical displacement of the upper and middle plates in relation to the lower dial plate as well as the relative displacement between the upper two plates provide both the necessary actuation (extension and retraction) of the pick-up units as well as the vertical displacement of the pick-up units and associated piece parts which occurs during indexing of the assembly dial plate. Since one oscillator's speed reducer drives the other oscillator's speed reducer and because the positive drive means between the speed reducers comprises adjustable gear elements, minute adjustments between the outputs of the speed reducers can be made. This results in acceptable synchronization between the upper and middle plates and thus of the pick-up units and parts grasped therein vis-a-vis the associated tooling structure.

Thus, it is a primary object of this invention to provide a synchronized, multiple-station, reciprocating, indexing, and picking assembly apparatus having a minimum number of oscillator drive components.

It is another object of this invention to provide adjustable positive drive means between speed reducers for a drive system in an automatic, cam-actuated assembly apparatus.

It is a further object of this invention to provide means for adjustably eliminating any unwanted phase differentials between the oscillator drive devices in a reciprocating, indexing, and picking assembly apparatus such that associated pick-up units and associated tooling operate in a substantially synchronized manner.

It is another object of this invention to utilize lost motion mechanisms and adjustable stop means in a synchronized, multiple-station assembly apparatus to eliminate the unwanted effects of manufacturing tolerances of associated cam devices.

It is a still further object of this invention to use synchronized reciprocation of multiple drive shafts to effect parallel vertical movement of assembly plates in a multiple-station assembly machine.

The means by which the foregoing and other objects of the present invention are accomplished and the manner of their accomplishment will be readily understood from the following specification upon reference to the accompanying drawings, in which.

DESCRIPTION OF THE PREFERRED EMBODIMENT

Figure 1:
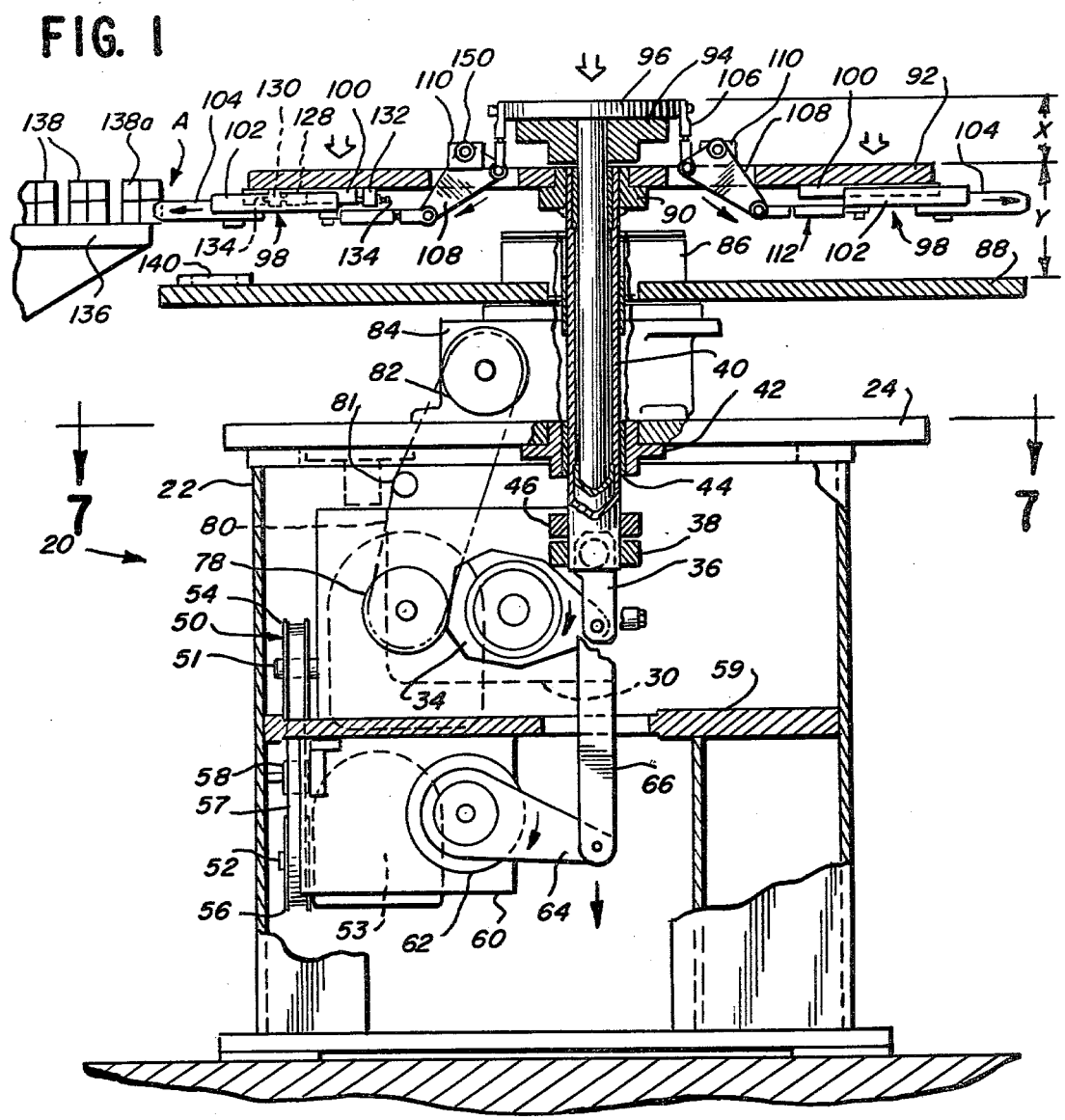
FIG. 1 is a front elevation of the reciprocating, indexing, and picking assembly apparatus of the present invention and of associated tooling structure and piece parts, and showing the various reciprocating plates in their lowermost positions.

Having reference to the drawings, wherein like reference numerals indicate corresponding elements, there is shown in FIG. 1 an illustration of the reciprocating, indexing, and picking assembly apparatus of the present invention, depicted generally for reference numeral 20. Assembly apparatus 20 comprises a base frame 22, a base top plate 24, and a motor 26 carried by frame 22. The motor 26 is connected through a motor adapter 27 to a first worm gear speed reducer 28. A first cam-actuated oscillator box 30 is connected to the output shaft 31 of reducer 28. Any of several well-known type cams can be utilized, however, the preferred type is a conjugate-type cam, such as is disclosed in U.S. Pat. No. 3,525,268.

An overload clutch 32, similar to the type disclosed in U.S. Pat. No. 3,282,387, is connected to the output shaft 33 of oscillator device 30. A first oscillator arm 34 is securely mounted at one end to clutch 32 and is pivotally connected at its other end to a first oscillator link 36. Link 36 is pivotally connected to a shaft clamp block 38 which itself is rigidly clamped onto the lower end of an outer shaft 40 of a first reciprocating drive means. A retainer bearing 42 carrying a bushing 44 is mounted to base top plate 24 and provides bearing support to outer shaft 40 which extends vertically and reciprocates therethrough. A first guide arm 46 is securely clamped to the lower end of outer shaft 40, and is guided for vertical movement within a guide track 48 mounted to the underneath of base top plate 24.

An adjustable positive drive means, the purpose of which will be explained later herein and which is generally depicted by reference numeral 50, connects an extended input shaft 51 of first reducer 28 to an input shaft 52 on a second speed reducer 53. The positive drive means 50 is comprised of gear pulleys 54 and 56, respectively mounted on shaft 51 and 52, a ribbed timing belt 57 matched to and running between pulleys 54 and 56, and a take-up roller assembly 58 mounted to frame 22.

A second cam-actuated oscillator box 60 is directly connected to second reducer 53 and is mounted for support to a support plate 59 which is carried by frame 22. A second overload clutch 62 is mounted to oscillator 60. A second oscillator arm 64 is securely mounted at one end to second clutch 62 and is pivotally mounted at its other end to the lower end of a second oscillator link 66. The upper end of second link 66 is pivotally connected to a clevis 68 which in turn is pin-connected to the lower end of an inner shaft 70 of a second reciprocating drive means. A second guide arm 72—vertically operating within guide track 48 in similar fashion to first guide arm 46—is securely clamped to the second or inner shaft 70. A shaft extension 74 (of input shaft 31 of first reducer 28) is supported by bearing block 76 mounted on support plate 59. A driving gear pulley 78 is securely mounted to shaft extension 74 and is connected, through a ribbed timing belt 80, a second take-up roller assembly 81 supported by base top plate 24, and a driven gear pulley 82, to an indexing mechanism 84. The indexer 84 is connected through a third overload clutch mechanism 86 to an assembly dial plate 88, the use of which will be explained later herein.

The outer reciprocating shaft 40 terminates at its upper end in a plate support 90 securely fastened thereto, such as by welding. A middle rise-and-fall or tooling plate 92 is supported by and rigidly affixed, such as by threaded fasteners, to plate support 90. In like manner, the inner reciprocating shaft 70 terminates at its upper end in a shaft end 94 and an upper rise-and-fall plate 96 rigidly mounted to shaft end 94. It is to be understood that plates 88, 92, and 96 are preferably formed of steel or aluminum and of sufficient thickness to accept suitable threaded fasteners.

Figure 3:
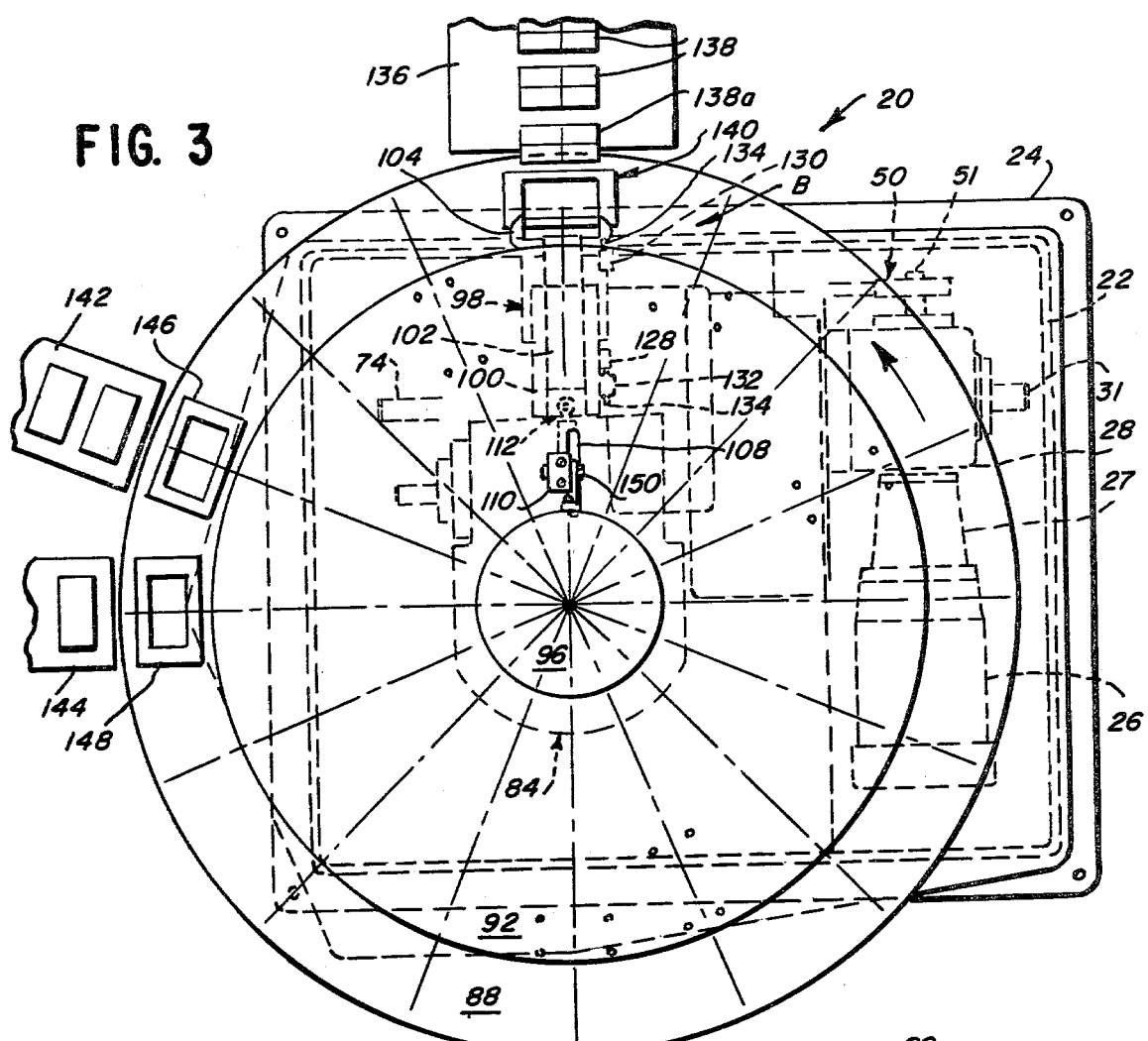
FIG. 3 is a plan view of the herein-disclosed assembly apparatus as shown in FIG. 4, and showing the location of associated parts-feeding structure.
Figure 4:
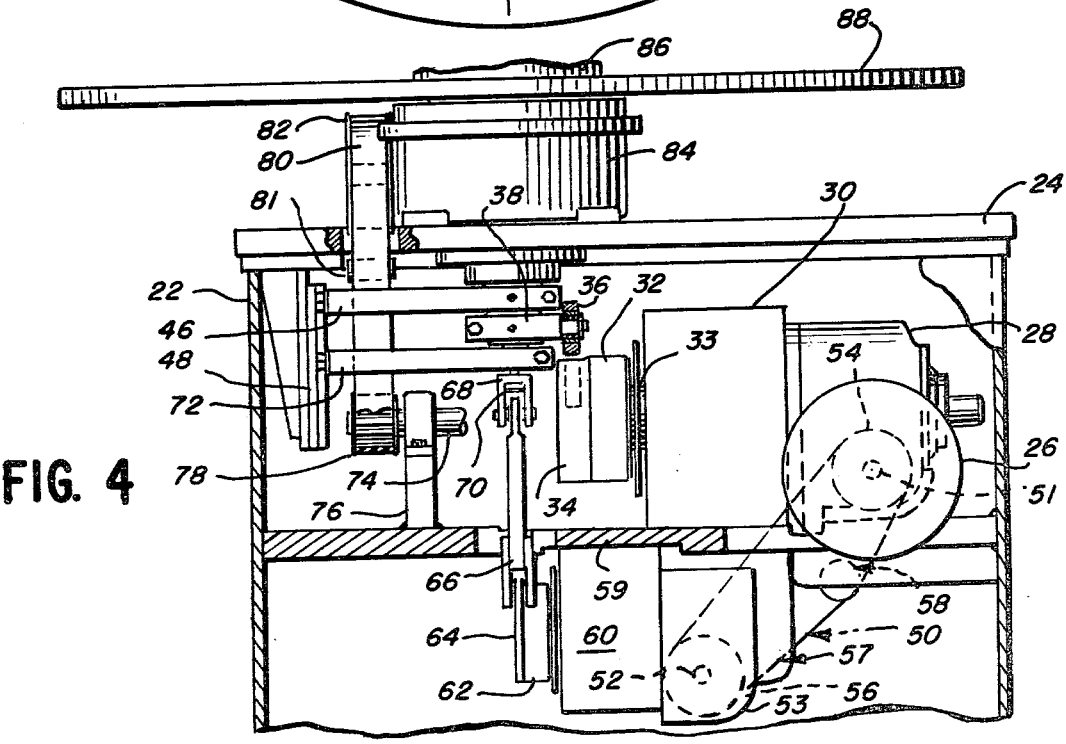
FIG. 4 is a side elevation of the assembly apparatus of FIG. 1.

As best seen in FIGS. 1 & 3, a plurality of pick-up or so-called pick and place slide units—generally depicted by reference numeral 98 and with only two shown for simplicity in FIG. 1—are mounted in desired locations to the underneath side of middle tooling plate 92. Each pick-up unit 98 comprises a slide track block 100 mounted to plate 92, a slide member 102 inserted over and guided by block 100, and a pick-up device 104 affixed at the outer radial end of slide member 102 by suitable threaded fasteners. The exact structural makeup of pick-up device 104 does not form a part of this invention; it can include any of several well-known types including mechanical, hydraulic, vacuum or magnetic pick-up components, for example, and which can be actuated by toggle switches, spring mechanisms, and so forth.

The control linkage assembly for each pick-up unit 98 includes a threadedly adjustable arm 106 fastened to the periphery of upper plate 96, a triangular-shaped pivot plate 108 pivotally mounted at a first end to arm 106 and at a second end to a pivot block 110 mounted to tooling plate 92, and a lost motion or cushion rod device 112 connecting the third end of pivot plate 108 to the inner radial end of slide member 102.

Figure 2:
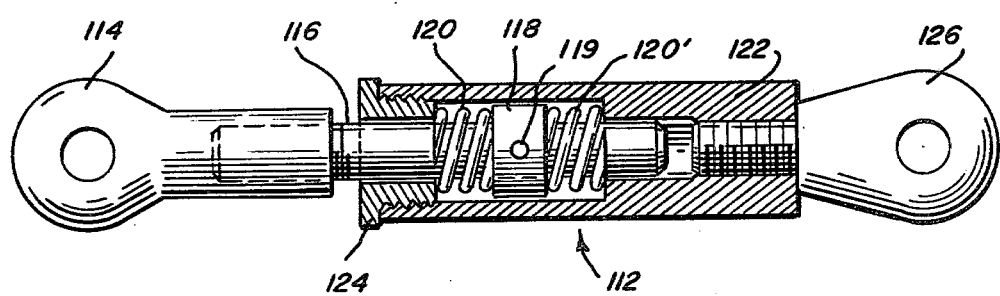
FIG. 2 is a side elevation of a lost motion device utilized with the present invention.

Each cushion rod device 112 (FIG. 2) comprises a left end eyelet 114, a stem member 116 threaded into eyelet 114 and having a retainer ring 118 pinned via pin 119 to its mid-section, and a pair of compression springs 120, 120' inserted over stem 116 at either side of ring 118. An outer case member 122 is inserted over both the ring 118 and springs 120, 120' and retained thereto by a threaded end plug 124, and a right end eyelet 126 is threaded into case member 122.

As best seen in FIGS. 1 & 3, each pick-up unit 98 has associated stop block means in the form of a stop block 128 carried on slide member 102 and end stop members 130, 132. The latter are securely mounted to the underneath side of tooling plate 92 in positions adjacent to the linear path of travel of slide member 102. Each end stop 130, 132 carries a threaded adjustment member 134 which, within limits, can be adjusted to alter the extent of travel of slide member 102.

As seen in FIGS. 1, 3, 5 & 6, a parts-feeding platform 136 carring a series of parts 138—which are to be assembled on dial plate 88—is positioned adjacent a first assembly station or parts fixture 140 located on plate 88.

Additional parts platforms 142, 144 can be utilized with corresponding second and third assembly stations 146 and 148 on dial plate 88 in locations where required (all shown in outline on FIG. 3). The number of such assembly stations is limited only by the physical dimensions and operational capacities of the various components of apparatus 20.

Figure 8:
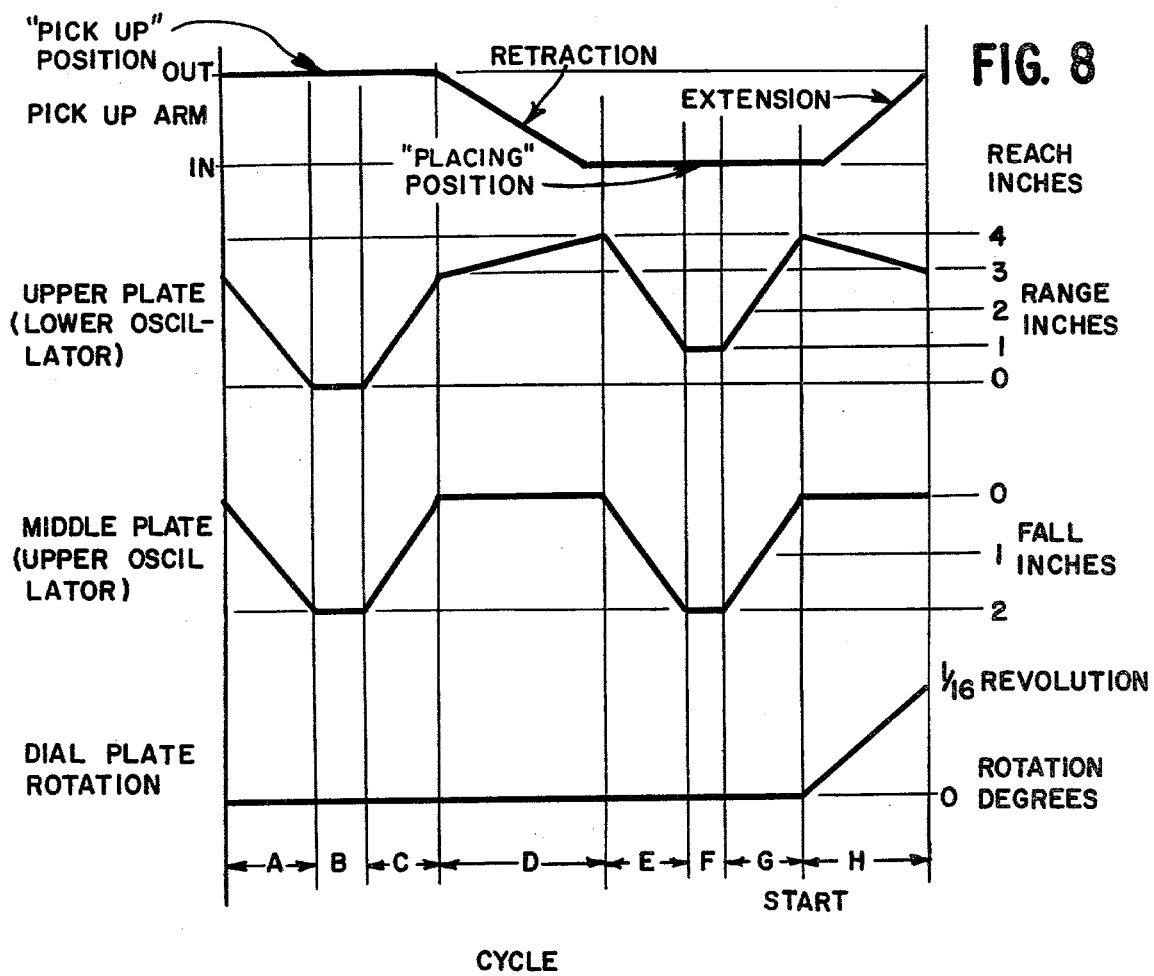
FIG. 8 is a chart depicting the vertical displacement, rotational indexing, and horizontal travel of various components of the present invention during a complete cycle of operation.

Turning now to the overall operation of the herein-disclosed reciprocating, indexing, and picking assembly apparatus, it is to be understood that the drive system for apparatus 20 operates such that the dial plate 88 sequentially indexes, i.e., horizontally rotates, the various parts carried thereon from one assembly position to another, while the middle and upper plates 92 and 96 vertically reciprocate both with respect to dial plate 88 and with respect to each other. Generally, the former type movement, when plates 92 and 96 move together, allows for "picked" parts and the associated tooling to be elevated out of the way when the dial plate and associated fixtures and parts carried therein are indexing to the next position. The latter type movement of plates 92 and 96 relative to each other, as will be explained, effects the sliding radial extension and retraction of pick-up units 98. It is to be noted that dial plate 88 only rotates and does not reciprocate, while plates 92 and 96 only reciprocate and do not rotate. The latter is due to the fact that first and second guide arms 46 and 72, which are respectively clamped to shafts 40 and 70, are vertically guided and maintained within guide track 48 and thereby prevent any rotational movement of plates 92 and 96. (By referring to FIG. 8, one can follow the movements of the major components of the present invention during a complete cycle of its operation. It will be understood that the straight line travels of the upper and middle plates 92, 96 as shown in FIG. 8 are for illustrative purposes only; in actual operation they are sinusoidal in nature.)

In FIG. 1, the slide member 102 is at its extended pick-up position with stop block 128 resting against end stop 130 and arm 104 grasping the first part 138a. As shown, the full downward displacement of plate 96 vis-a-vis tooling plate 92 has, through arm 106, caused pivot plate 108 to pivot about pin 150 and thereby caused cushion rod 112 to move slide member 102 to its extended radial position. It will be noted that first and second oscillator arms 34 and 64 have been so rotated (in the clockwise direction of the arrows in FIG. 1) by first and second oscillator boxes 30 and 60, respectively, that during this "parts picking" portion of the operating cycle they are each in their lowermost positions. Accordingly, the outer and inner reciprocating shafts 40 and 70, and the middle and upper plates 92 and 96 respectively connected thereto, are also in their lowermost positions (see bold arrows). The relative positions of the various components during this "parts picking" portion of a cycle of operation are graphically depicted in FIG. 8 by reference letter B. Further, the positions of the components when effecting the extension of the slide member 102 is depicted as segment H, while the lowering of plates 92 and 96 down to their lowermost positions is depicted as segment A.

As seen in FIG. 1 then, the relative minimal displacement between tooling or middle plate 92 and dial plate 88 is represented by the distance labelled "Y", while the relative minimal displacement between upper plate 96 and middle plate 92 is represented by the distance labelled "X". It is the accurate maintenance of these and other relative displacements, through the synchronization of various operating components, with which this invention is primarily concerned.

Figure 5:
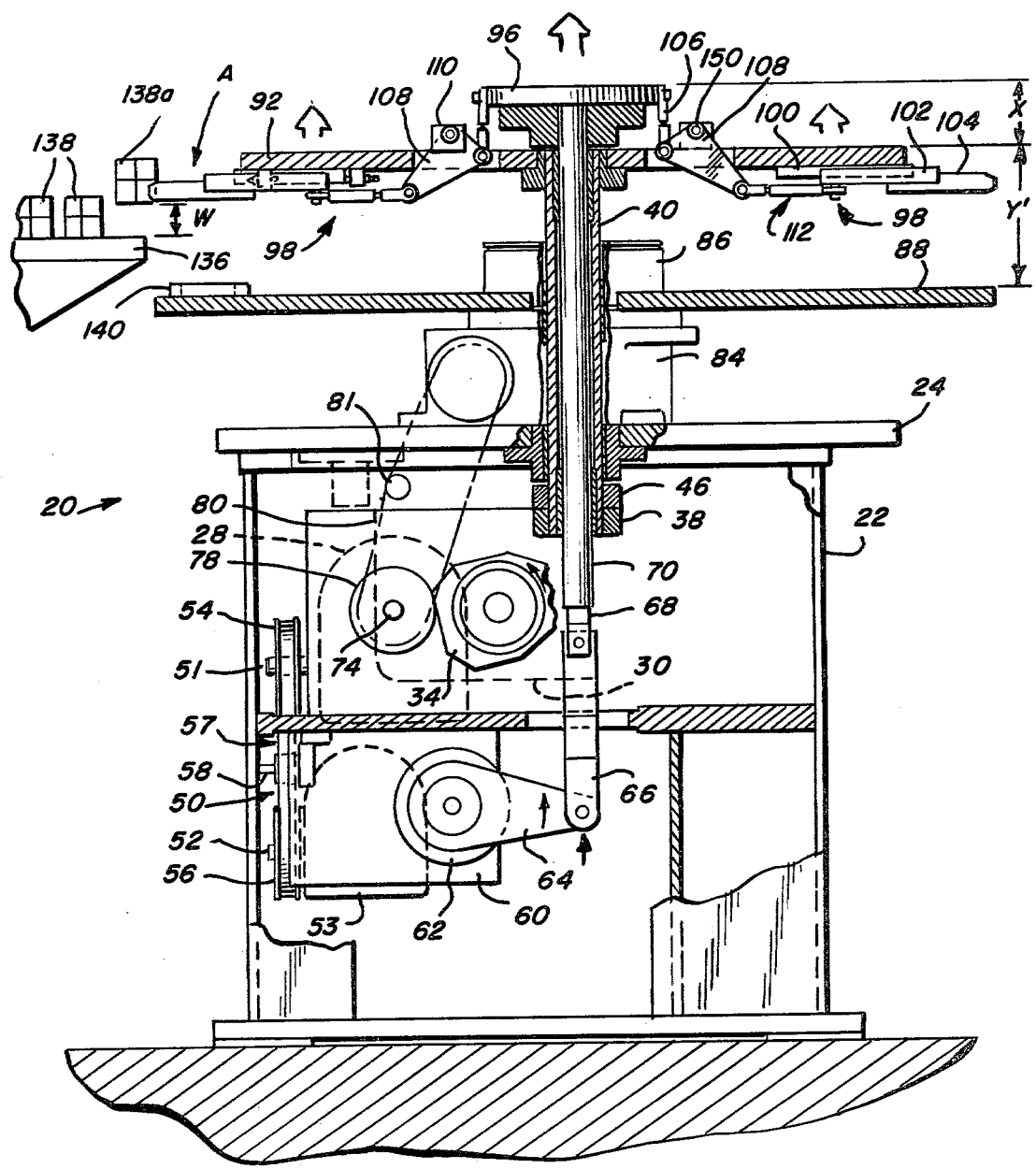
FIG. 5 is a front elevation similar to FIG. 1 but showing component parts in a changed operating position and with some parts eliminated or fragmented for better viewing.

FIG. 5, as compared to FIG. 1, shows that both the first and second oscillator arms 34 and 64 have been simultaneously rotated counterclockwise (as will be explained later herein) to new, somewhat raised positions. In this "parts elevating" portion of the operating cycle, the reciprocating shafts 70 and 40, and the plates 92 and 96, have both been elevated relative to dial plate 88, by equal increments—to a new distance "Y'" for tooling plate 92 and to a new distance equivalent to "X" plus "Y'" for upper plate 96. However, the relative distance ("X") between plates 92 and 96 has not changed. Thus, the slide member 102 has not been radially retracted from the extended "pick-up" position, but rather the part 138a (FIG. 5) grasped by device 104 has been raised to a height labelled "W" off of parts platform 136. In FIG. 8, this "parts elevating" portion of the cycle is graphically depicted by letter C.

Figure 6:
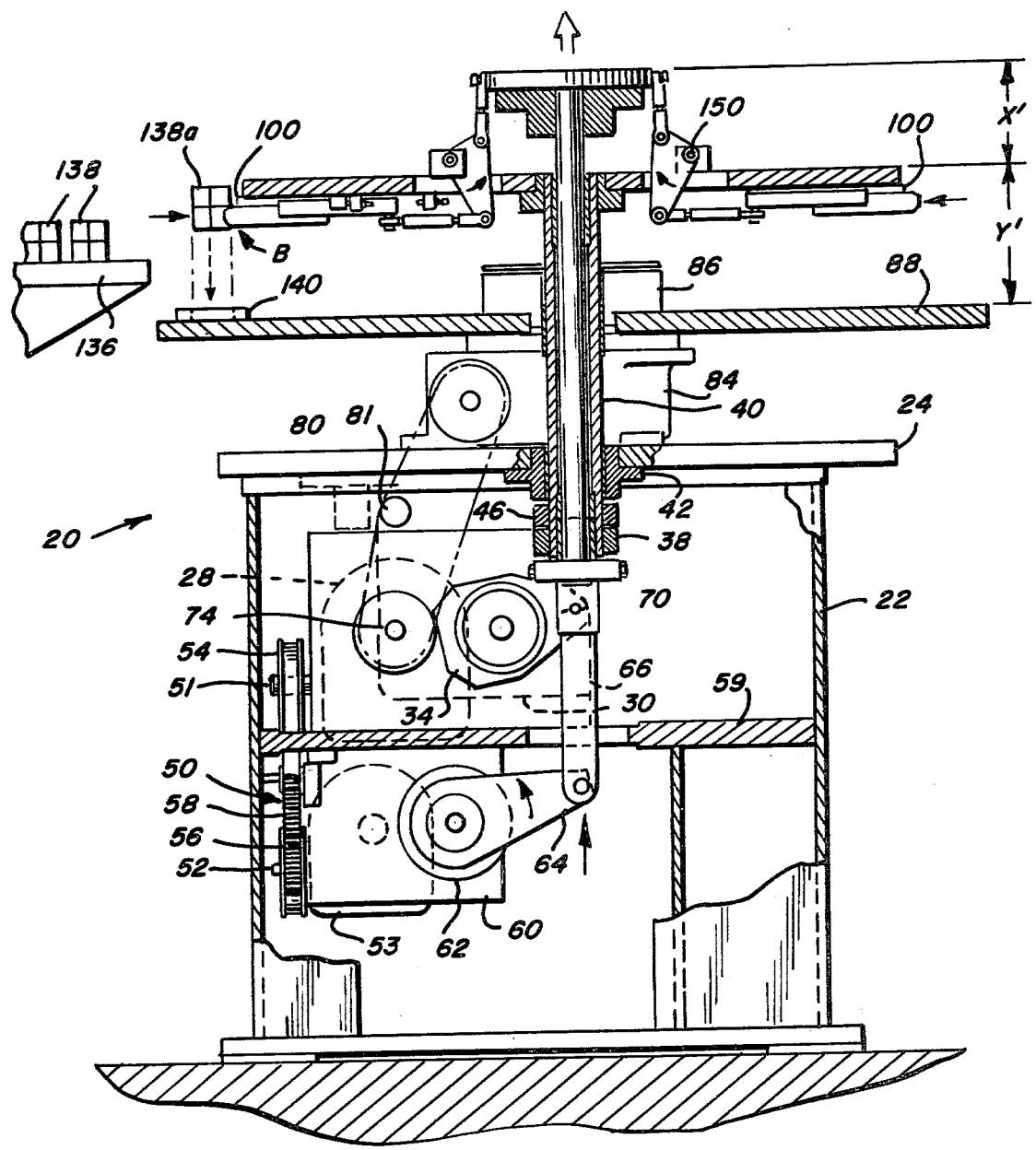
FIG. 6 is similar to FIG. 5 but showing the component parts in another operating position.
Figure 7:
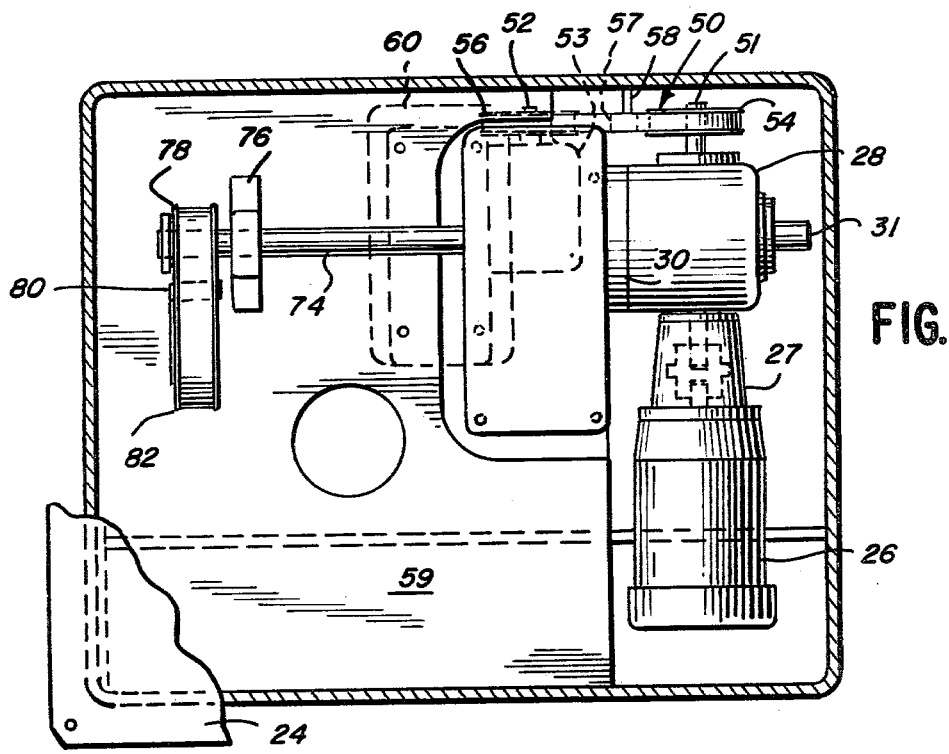
FIG. 7 is a plan view of the apparatus taken along line 7—7 of FIG. 1 with certain parts fragmented for better viewing, and showing various drive components in outline.

FIG. 6, as compared first to FIG. 5, and then FIG. 1, shows that the second oscillator arm 64, under the continued action of second oscillator box 60, has been further rotated counterclockwise and thus raised to yet another position. In this case, since the other oscillator arm 34 does not rotate during this "retraction" portion of the operating cycle—due to a dwell in the cam device (not shown) within first oscillator box 30—the vertical moving of inner shaft 70 via link 66 causes upper plate 96 to be upwardly displaced to its uppermost position both as to middle plate 92 and dial plate 88. This maximal relative displacement between upper plate 96 and middle plate 92 is shown as new distance "X'" (FIG. 6). The positions of the various components in this "retraction" portion of a cycle are shown as segment D in FIG. 8.

The effect of the repositioning of plate 96 relative to plate 92 is to cause the pick-up unit 98 to be radially retracted from its extended positions (shown as position A, FIGS. 1 & 5) and moved to its innermost "parts placing" position (shown as position B, FIGS. 3 & 6). When in position B (FIG. 6), the retracted pick-up unit 98 places part 138a directly over first tooling station 140, or over whatever new tooling or assembly station the indexing of dial plate 88 has placed underneath that particular unit 98. It will be understood that the indexing of dial plate 88 of the preferred embodiment, depicted in segment H in FIG. 8, occurs during the "extension" portion of the cycle when the slides 102 are being extended, i.e., that portion of the cycle which results in the positions of the components as they are depicted in FIG. 1. Such indexing could alternatively be accomplished during the "retraction" portion (segment D in FIG. 8) as depicted in FIG. 6.

In completing a cycle of operation, wherein part 138a is "placed-into" tooling station 140 (see dotted arrow in FIG. 6)—both plates 92 and 96 are lowered through appropriate parallel, clockwise movements of oscillators 30, 60 and oscillator arms 34, 64, respectively. In this cycle segment (see segment E, FIG. 8), the relative distance ("X'") between plates 92 and 96 is maintained, and thus the pick-up units 98 remain in their radially retracted positions. Once part 138a is placed into station 140, the pick-up device 104 releases part 138a (not shown). This occurs during the "parts placement" segment depicted as segment F in FIG. 8. The last segment of a cycle of operation is to elevate the plates 92 and 96 back to the cycle starting point discussed above in relation to FIG. 1. This last segment is represented as segment G in FIG. 8. Here, the plates move in parallel and thus the pick-up units 98 continue to remain in their retracted positions (shown as position B in FIG. 6).

It will be noted in FIG. 6 that the stop block 128 on slide 102 rests against end stop 132, the latter having been first properly adjusted through threaded member 134 to allow part 138a to be accurately placed over tooling station 140. It will be understood that a certain amount of overtravel of slide member 102 is purposely incorporated into the assembly apparatus 20, both at positions A and B thereof (see FIGS. 1 & 6). Stated another way, if it were not for the presence of stop block 128 and end stops 130, 132, the slides 102 could move to more extreme end positions. However, block 128 and stops 130, 132 when adjusted by member 134, prevent such overtravel by stopping slide member 102 near the end of each extension or retraction movement. This stopping occurs when slide 102 is near the zero velocity portion of its travel so there are no unnecessary shock loads set up in apparatus 20.

Thus, due to this accurate end-positioning of slide 102 through the stop means, any non-parallel movements of plates 92 and 96—due to manufacturing tolerance variations in the cam devices of oscillator boxes 30 and 60—are not seen by slides 102 but are taken up within the cushion rods 112. Any non-parallel or unsynchronized vertical movements of plates 92 and 96, of course, would cause a horizontal fluttering or radial shifting of slide 102 vis-a-vis a respective tooling station, such as station 140. This horizontal flutter problem is most critical when parts are being vertically "picked up" or "placed" in tooling fixtures or when a secondary part is being placed on a part already partially assembled (such as would occur during operation segments A, C, E, and G in FIG. 8, for instance).

One of the more important aspects of this invention is the use of the two speed reducers 28 and 53, and the fact that the input of each reducer is tied together by the adjustable positive drive means 50. If only one reducer were used to direct drive the two oscillators there would be no fine adjustment capability, i.e., the plates 92, 96 could not be readily synchronized. For instance, if the first reducer (28) was set up to drive the second oscillator (60) and the gear pulley on the oscillator (60) had 36 teeth, for example, a one tooth adjustment of the connecting timing belt (157) on the 36 tooth gear pulley would result in an excessive ten degree (10°) phase shift between the outputs of oscillators 30 and 60, and ultimately between plates 92 and 96.

However, since in the present invention the two reducers (28, 53) are tied together by an adjustable drive 50, a minute adjustment between the oscillators 30 and 60 can be achieved. This is because any adjustment between the input shafts 51 and 52 of reducers 53 and 56, respectively, is diminished by the reduction ratio of the second reducer 56 before being transmitted through the second oscillator 60. For instance, if gear pulley 52 had 36 teeth and was used with second reducer 56 having a sixty to one (60:1) reduction ratio and a one tooth adjustment were made, the second oscillator 60 would only see a one-sixth of a degree (1/6°) phase shift between the outputs of the oscillators 30 and 60. This provides, of course, sufficient adjustment capability through drive means 50 until the displacement of plates 92 and 96 can be made substantially parallel, i.e., synchronized. In the present invention then, the adjustment of the positive drive means and the presence of cushion rod assemblies and associated stop means respectively provide the overall synchronization of the upper and middle reciprocating plates and the elimination of unwanted shifting between the pick-up units and tooling structure due to cam manufacturing tolerances. These two facts assure substantially vertical handling of piece parts during assembly on the dial plate.

From the foregoing, it is believed that those skilled in the art will readily appreciate the unique features and advantages of the present invention over previous types of automatic, multiple-station cam-actuated assembly apparatus. Further, it is to be understood that while the present invention has been described in relation to a particular preferred embodiment as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

The embodiments of the invention in which an exclusive property or privilege is claimed are defined as follows:

1. A multiple-station, automatic assembly apparatus comprising a base frame; motor means mounted on said base frame; a first reducer means drivably connected to said motor means; a second reducer means; an adjustable, positive drive means drivably connecting said first and second reducer means; an indexer device drivably connected to said first reducer means and characterized as operable when driven to provide a rotational indexing to an assembly dial plate mounted thereon; a first oscillator means drivably connected to said first reducer means and further connected through first linkage means to a first shaft means; a second oscillator means drivably connected to said second reducer means and further connected through second linkage means to a second shaft means; said first and second oscillator means characterized as operable when driven to provide cyclic reciprocating motion to said first and second shaft means, respectively; first and second plate means respectively mounted on said first and second shaft means and reciprocably moved thereby; a plurality of pivotal linkage means mounted on said second plate means; and a plurality of slideable pick-up units mounted said first plate means and respectively connected to said pivotal linkage means; whereby relative displacement between said first and second plate means, due to the reciprocal actuation of said first and second shaft means, effects extension and retraction of said pick-up units, and further whereby adjustment of said positive drive means provides substantial synchronization of the reciprocation of said first and second plate means.

2. The apparatus of claim 1, wherein said first shaft means is concentrically mounted within said second shaft means.

3. The apparatus of claim 1, including end stop means associated with said slideable pick-up units and wherein said pivotal linkage means include cushion rod means, whereby said stop means and cushion rod means cooperate to substantially eliminate radial shifting of the pick-up units at the full extended and full retracted positions thereof.

4. In a motor-driven, automatic, reciprocating, indexing, and picking assembly device of the type wherein vertically reciprocating plates driven by cam-actuated oscillator means effect both the vertical displacement and the horizontal extension and retraction of associated parts pick-up units, the improvement comprising: a motor driven first reducer means characterized as driving a first oscillator means, a second reducer means operable to drive a second oscillator means, and an adjustable positive drive means drivably connecting said first and second reducer means, whereby adjustment of said positive drive means effects substantial synchronization of the outputs of the said first and second oscillator devices.

5. An automatic, motor-driven, parts assembly apparatus comprising in combination: a base frame; a motor mounted thereon; an assembly dial plate rotatably mounted on an indexer mechanism and characterized as being rotatably indexed thereby; a first tooling plate means mounted on a first reciprocating shaft means; a second tooling plate means mounted on a second reciprocating shaft means; a plurality of pick-up units mounted on one of said tooling plate means, said pick-up operably connected to the other of said tooling plates by a corresponding plurality of pivotal linkage means carried by said other plate means; a first reducer means driven by the motor and characterized as driving said indexer mechanism; a first oscillator means driven by said first reducer means and operable to reciprocably drive said first shaft means and said first tooling plate mounted thereon; a second reducer means; a second oscillator means driven by said second reducer means and operable to reciprocably drive said second shaft means and said second tooling plate mounted thereon; and a positive drive means drivably connecting said first and second reducer means and characterized as being operable when correctly adjusted to substantially synchronize the outputs of said first and second reducer means.

6. In a reciprocating, indexing, and parts picking assembly apparatus having a base frame, a motor means, an assembly dial plate rotatably driven by an indexer mechanism, a first tooling plate carrying a plurality of slideable pick-up units, and a second tooling plate having a plurality of pivotal linkages mounted thereon in registry with said pick-up units and operatively connected thereto, the improvement which comprises: a first reciprocating drive means including a first reducer means drivably connected to a first oscillator means, said first oscillator means operable when driven to reciprocably drive the first tooling plate; a second reciprocating drive means including a second reducer means drivably connected to a second oscillator means, said second oscillator means operable when driven to reciprocably drive the second tooling plate; means connecting said first and second reciprocating drive means and characterized as operable when adjusted to effect substantial synchronization of the reciprocation of said first and second tooling plates during periods of reciprocation of said plates where there is no relative displacement therebetween.

* * * * *

UNITED STATES PATENT AND TRADEMARK OFFICE
CERTIFICATE OF CORRECTION

PATENT NO. : 4,202,435
DATED : May 13, 1980
INVENTOR(S) : Josef Mang et al.

It is certified that error appears in the above—identified patent and that said Letters Patent is hereby corrected as shown below:

Column 9, line 20, after "pick-up" insert --units--.

Signed and Sealed this

Ninth Day of September 1980

[SEAL]

Attest:

SIDNEY A. DIAMOND

Attesting Officer     Commissioner of Patents and Trademark.